United States Patent
Yanaka

(10) Patent No.: US 10,399,181 B2
(45) Date of Patent: Sep. 3, 2019

(54) LASER CLADDING APPARATUS

(71) Applicant: TOYOTA JIDOSHA KABUSHIKI KAISHA, Toyota-shi, Aichi (JP)

(72) Inventor: Kohei Yanaka, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/934,815

(22) Filed: Nov. 6, 2015

(65) Prior Publication Data

US 2016/0144455 A1    May 26, 2016

(30) Foreign Application Priority Data

Nov. 21, 2014   (JP) .................. 2014-236475

(51) Int. Cl.
*B23K 26/16* (2006.01)
*B23K 26/144* (2014.01)
(Continued)

(52) U.S. Cl.
CPC .......... *B23K 26/144* (2015.10); *B23K 26/142* (2015.10); *B23K 26/34* (2013.01); *B33Y 30/00* (2014.12)

(58) Field of Classification Search
CPC .... B23K 26/142; B23K 26/144; B23K 26/34; B23K 26/16; B23K 26/1224; B23K 26/10; B23K 26/1462; B33Y 30/00
(Continued)

(56) References Cited

U.S. PATENT DOCUMENTS 4,027,137 A * 5/1977 Liedtke ............... B23K 26/123
                                                    219/121.6
4,984,396 A * 1/1991 Urakami ............... B24C 3/062
                                                    451/102
(Continued)

FOREIGN PATENT DOCUMENTS

JP           10-37651 A    2/1998
JP          2008-188648    8/2008
(Continued)

OTHER PUBLICATIONS

Office Action dated Sep. 29, 2017 in Chinese Patent Application No. 201510809840.7 (with partial English Translation).
(Continued)

*Primary Examiner* — Tu B Hoang
*Assistant Examiner* — Diallo I Duniver
(74) *Attorney, Agent, or Firm* — Oblon, McClelland, Maier & Neustadt, L.L.P.

(57) ABSTRACT

A laser cladding apparatus is capable of easily collecting metal powder and improving operational efficiency. The laser cladding apparatus clads valve seats of exhaust ports formed in a cylinder head by irradiating the valve seats with a laser beam while supplying metal powder to the valve seats. The laser cladding apparatus includes: a duct connected to the exhaust ports; and a dust collector that sucks a surplus of the metal powder generated at the valve seats. The duct has a vertical part formed in a straight tube and arranged so that the axis thereof is substantially vertical, and a branched part branched from the vertical part and arranged so that the branched direction is upward relative to the horizontal direction. The dust collector is connected to the tip of the branched part.

6 Claims, 3 Drawing Sheets

(51) Int. Cl.
  *B23K 26/34* (2014.01)
  *B23K 26/142* (2014.01)
  *B33Y 30/00* (2015.01)
(58) Field of Classification Search
  USPC ............... 219/76.1, 121.84, 121.63, 121.73
  See application file for complete search history.

(56) References Cited

U.S. PATENT DOCUMENTS

| | | | | |
|---|---|---|---|---|
| 6,227,264 | B1* | 5/2001 | Schenk, Jr. | ............ B65B 39/00 |
| | | | | 141/286 |
| 8,097,825 | B2* | 1/2012 | Sato | ................... B23K 26/103 |
| | | | | 219/64 |
| 8,302,305 | B2* | 11/2012 | Kawasaki | ............. B23K 35/30 |
| | | | | 29/888.44 |
| 2001/0008230 | A1* | 7/2001 | Keicher | ............ B01F 13/0255 |
| | | | | 219/121.63 |
| 2002/0129485 | A1* | 9/2002 | Mok | .................. G05B 19/4099 |
| | | | | 29/527.2 |
| 2006/0032843 | A1* | 2/2006 | Crouse | ................... E04G 23/00 |
| | | | | 219/121.72 |

FOREIGN PATENT DOCUMENTS

| | | |
|---|---|---|
| JP | 2013-541423 A | 11/2013 |
| WO | WO 2012/054078 A1 | 4/2012 |

OTHER PUBLICATIONS

Jin et al., "Inertial Force Dust Removing Device," Metallurgical Environmental Engineering. Central South University Press, Apr. 30, 2009, pp. 81-82.

\* cited by examiner

LASER CLADDING APPARATUS

TECHNICAL FIELD

Preferred embodiments relate to a laser cladding apparatus, and specifically to a technique for easily collecting a surplus of metal powder during cladding, thereby improving operational efficiency of the laser cladding apparatus.

BACKGROUND

Conventionally, there is a known technique for cladding valve seats of a cylinder head in order to improve abrasion resistance and the like.

In the cladding, metal powder is molten by irradiating the valve seats with a laser beam and injecting the metal powder to the irradiated portion thereof, thereby the valve seats being partly coated with a metal different from the valve seats.

During the cladding, all of the metal powder does not adhere to the valve seats, and a surplus of the metal powder exists. If the surplus is allowed to stand, the surplus may enter gaps of parts and manufacturing devices, which causes trouble. Therefore, it is desirable to collect the surplus immediately.

Conventionally, various techniques for collecting the surplus of the metal powder during the cladding have been developed. For example, JP 2008-188648 A discloses one of the techniques.

In accordance with the conventional technique disclosed in JP 2008-188648 A, during the cladding of the valve seats using a laser cladding apparatus, the surplus of the metal powder and fumes are sucked to remove them from the valve seats.

Moreover, in accordance with the conventional technique disclosed in JP 2008-188648 A, a duct for sucking the metal powder and the fumes is provided with a filter to catch the sucked fumes and metal powder.

In the laser cladding apparatus, if air flow is increased to suck the metal powder, the metal powder to be attached to the valve seats is also sucked. Therefore, the air flow cannot be increased with no reason.

In the conventional technique disclosed in JP 2008-188648 A, the metal powder easily accumulates in a horizontal part of the duct, resulting in high frequency of cleaning of the duct.

Moreover, in the conventional technique, maintenance (replacement or cleaning) of the filter is frequently performed in order to avoid decrease in the air flow caused by clogging of the filter.

For this reason, it is difficult to improve operational efficiency when performing the cladding and collecting the metal powder.

SUMMARY

Preferred embodiments address the problem described above. An object of preferred embodiments is to provide a laser cladding apparatus capable of easily collecting metal powder and improving operational efficiency.

A problem to be addressed by the preferred embodiments is described above, and ways of addressing the problem are described below.

According to one embodiment, a laser cladding apparatus clads a portion of a workpiece by irradiating the portion with a laser beam while supplying metal powder to the portion. The laser cladding apparatus includes: a duct connected to the portion of the workpiece; and a dust collector that sucks a surplus of the metal powder generated at the portion of the workpiece. The duct has a vertical part that is formed in a straight tube and that is arranged so that an axis of the vertical part is substantially vertical, and a branched part that is branched from the vertical part and that is arranged so that a direction in which the branched part is branched is upward relative to a horizontal direction. The dust collector is connected to a tip of the branched part.

According to embodiments, the branched part forms an acute angle with a portion of the vertical part situated above a connection between the vertical part and the branched part.

According to embodiments, the duct has a diameter-reduction part that is arranged below the connection between the vertical part and the branched part, and that has a narrowed portion whose duct area is smaller than that of the portion of the vertical part situated above the connection between the vertical part and the branched part. A lower end of the diameter-reduction part is open below the narrowed portion.

Preferred embodiments can produce the following effects.

Metal powder can easily be separated from exhaust air containing the metal powder and fumes. This makes it possible to restrain the metal powder from accumulating in a duct and to reduce frequency of maintenance of the duct, thus enabling to improve operational efficiency of a laser cladding apparatus.

The metal powder can reliably be separated from the exhaust air containing the metal powder and the fumes.

The metal powder separated from the exhaust air containing the metal powder and the fumes can easily be collected.

DETAILED DESCRIPTION

An embodiment is described below.

A laser cladding apparatus 10 according to an embodiment is described with reference to FIGS. 1 and 2.

Hereinafter, the direction of an arrow X in FIG. 1 indicates the vertically upward direction, and the vertical direction is defined based on the direction of the arrow X (the same shall apply in FIG. 3). Moreover, a direction perpendicular to the arrow X in FIG. 1 indicates a horizontal direction.

First, a cylinder head 1 as a workpiece to be clad by the laser cladding apparatus 10 is described.

Figure 1:
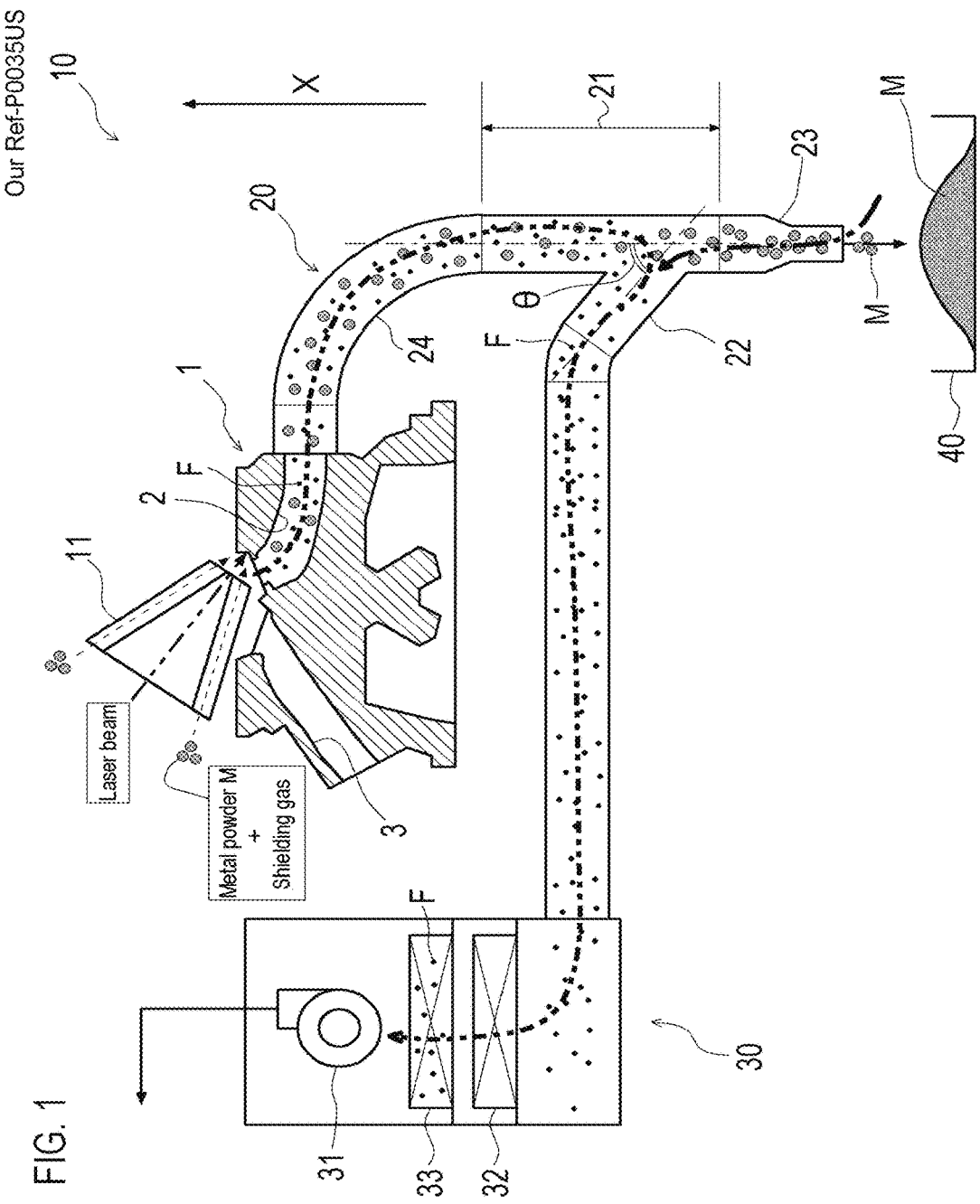
FIG. 1 shows an overall structure of a laser cladding apparatus according to an embodiment.

As shown in FIG. 1, the cylinder head 1 constitutes a part of an engine, and has exhaust ports 2 and intake ports 3. The exhaust ports 2 and the intake ports 3 are to be clad.

Specifically, the exhaust ports 2 and the intake ports 3 have valve seats 2a and valve seats 3a with which valves (not shown) are to be brought into contact, the valve seats 2a and the valve seats 3a being to be clad.

Next, the overall structure of the laser cladding apparatus 10 is described. As shown in FIG. 1, the laser cladding apparatus 10 clads the valve seats 2a and the valve seats 3a of the cylinder head 1. The laser cladding apparatus 10 includes a cladding nozzle 11, a duct 20, and a dust collector 30.

In the embodiment of FIG. 1, the laser cladding apparatus 10 dads the valve seats 2a of the exhaust ports 2 out of the ports 2 and 3 formed in the cylinder head 1.

Further, the laser cladding apparatus 10 includes a laser oscillator (not shown) and a jig (not shown) of supporting the cylinder head 1.

The laser cladding apparatus 10 may clad a workpiece other than the cylinder head 1.

The cladding nozzle 11 irradiates an object to be clad with a laser beam, and blows metal powder M and a shielding gas to the object. The cladding nozzle 11 is configured to inject the metal powder M and the shielding gas along the axis of the laser beam.

The metal powder M is powdered metal different from metal of the cylinder head 1. For example, metal mainly containing copper may be used as the metal powder M.

The laser cladding apparatus 10 dads the valve seats 2a so that the cladding nozzle 11 irradiates the valve seats 2a with the laser beam and blows the metal powder M and the shielding gas to a position to which the laser beam is applied.

Specifically, the laser cladding apparatus 10 melts the metal powder M on the valve seats 2a in an atmosphere of the shielding gas with the laser beam to coat the valve seats 2a with the molten metal powder M.

In the cladding of the valve seats 2a, the dust collector 30 is connected, through the duct 20, to the opposite ends of the exhaust ports 2 to the valve seats 2a. The laser cladding apparatus 10 clads the valve seats 2a while sucking air in the vicinity of the valve seats 2a through the exhaust ports 2 with the duct 20 and the dust collector 30.

During the cladding, most of the metal powder M supplied to the valve seats 2a adheres the valve seats 2a, but a part of the metal powder M remains in the vicinity of the valve seats 2a in powder form without melting. The laser cladding apparatus 10 sucks, with the duct 20 and the dust collector 30, a surplus of the metal powder M remaining in powder form and fumes F (fine powder dust resulting from cooling of vaporized metal) generated during the cladding to remove the surplus of the metal powder M and the fumes F from the valve seats 2a.

The fumes F consist of grains each having a diameter and a weight smaller than those of the metal powder M. In the present embodiment, the diameter of the metal powder M is approximately 10-150 μm, and the diameter of the grain of the fumes F is approximately 1 μm or less. Thus, the fumes F are extremely lighter than the metal powder M. In other words, the fumes F move through the flow of the exhaust air more easily than the metal powder M.

Figure 2:
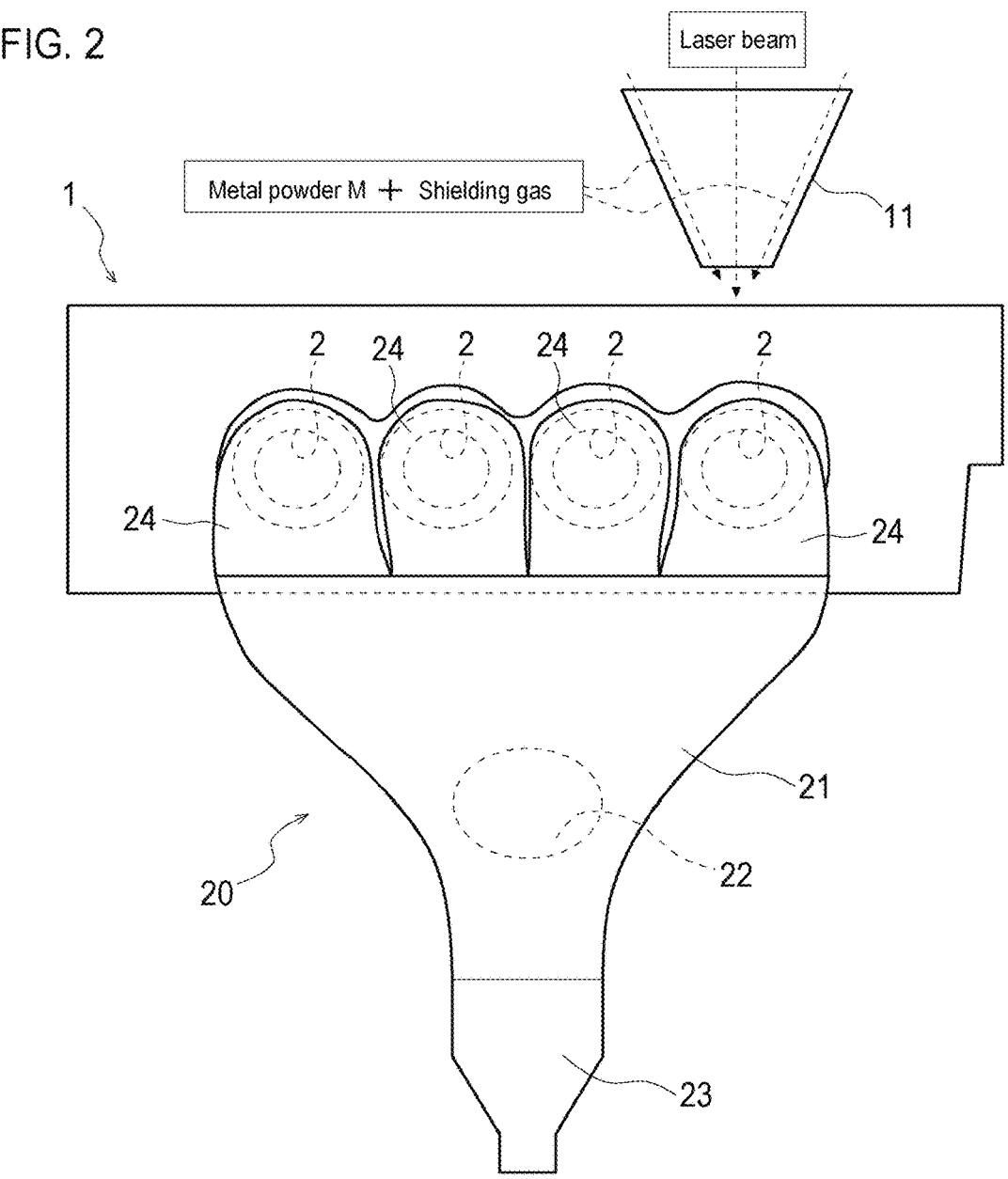
FIG. 2 shows a duct connected to a cylinder head.

As shown in FIGS. 1 and 2, the duct 20 connects the cylinder head 1 and the dust collector 30. The duct 20 has a vertical part 21, a branched part 22, a diameter-reduction part 23, and connecting parts 24.

The dust collector 30 sucks the surplus of the metal powder M and the fumes F generated in the vicinity of the valve seats 2a through the duct 20.

The vertical part 21 forms a part of the duct 20, and is formed in a straight tube. The vertical part 21 is arranged so that the axis thereof is substantially vertical (completely vertical in the present embodiment). In other words, the vertical part 21 extends linearly and vertically. The exhaust air flows through the vertical part 21 in substantially the vertically downward direction.

The branched part 22 forms a part of the duct 20, and is branched from the vertical part 21. The branched part 22 is arranged so that the branched direction (direction in which the exhaust air flows from the base end of the branched part 22) is upward relative to the horizontal direction.

The duct 20 drastically changes the flow direction of the exhaust air, in the branched part 22, that flows in substantially the vertically downward direction in the vertical part 21 into an upward direction relative to the horizontal direction.

The diameter-reduction part 23 forms a part of the duct 20, and is arranged below the portion of the vertical part 21 where the branched part 22 is formed. The diameter-reduction part 23 extends downward from the portion of the vertical part 21 where the branched part 22 is formed so that the axis of the diameter-reduction part 23 is substantially vertical.

The diameter-reduction part 23 has a narrowed portion whose duct area is smaller than that of the portion of the vertical part 21 situated above the branched part 22 (the portion of the vertical part 21 situated on the upstream side of the flow direction of the exhaust air).

In the present embodiment, the lower end of the diameter-reduction part 23 is open to enable the inflow of air through the diameter-reduction part 23 and to discharge the metal powder M through the diameter-reduction part 23. In the diameter-reduction part 23, a portion situated below the narrowed portion whose duct area is reduced is open.

As shown in FIG. 2, the connecting parts 24 are connected to the respective exhaust ports 2. Air in the exhaust ports 2 is sucked through the connecting parts 24. The connecting parts 24 converge on the downstream side of the flow direction of the exhaust air, and are connected to one duct (the vertical part 21 in the present embodiment).

It is preferable that the connecting parts 24 are formed similarly to an exhaust manifold so that the amounts of the exhaust air in the connecting parts 24 are equal to each other.

The laser cladding apparatus 10 is provided with a pressing device (not shown) that holds the connecting parts 24 and presses the connecting parts 24 toward the cylinder head 1 so that gaps are not formed between the exhaust ports 2 and the connecting parts 24.

As mentioned above, the laser cladding apparatus 10 according to the embodiment includes the duct 20. The duct 20 has the plurality of connecting parts 24 connected to the respective exhaust ports 2 of the cylinder head 1. The connecting parts 24 converge so as to connect with the vertical part 21.

This makes it possible to reliably remove the metal powder M and the fumes F from the valve seats 2a of the exhaust ports 2.

The dust collector 30 has an exhaust fan 31, a first filter 32 for catching the metal powder M, and a second filter 33 for catching the fumes F. The dust collector 30 sucks the metal powder M and the fumes F in the vicinity of the valve seats 2a through the duct 20 by running the exhaust fan 31, to catch the metal powder M and the fumes F with the filters 32 and 33, respectively.

The dust collector 30 is connected to the tip of the branched part 22 (the opposite end of the branched part 22 to the vertical part 21) of the duct 20.

The flow of the metal powder M and the fumes F through the duct 20 is further described.

As shown in FIG. 1, the metal powder M and the fumes F in the vicinity of the valve seats 2a move, through the flow of air sucked by the dust collector 30 through the duct 20, to the duct 20 through the exhaust ports 2 together with the shielding gas and air. Then, the metal powder M and the fumes F pass through the vertical part 21, and thereafter flow in a different direction drastically in the branched part 22.

At this time, the metal powder M falls down and moves toward the diameter-reduction part 23, without moving toward the branched part 22, by inertial force acting in substantially the vertically downward direction along the flow direction of the exhaust air and by gravity acting on the metal powder M.

In the present embodiment, the vertical part 21 is arranged to be completely vertical. However, the orientation of the vertical part 21 of the laser cladding apparatus 10 is not limited to such an orientation that the axis of the vertical part 21 is completely vertical. The vertical part 21 may be arranged to be "substantially vertical".

The term "substantially vertical" indicates such an orientation that the metal powder M having flowed into the vertical part 21 together with the exhaust air moves straight in substantially the vertically downward direction by inertial force and gravity without moving toward the branched part 22. The vertical part 21 may be inclined at a predetermined angle relative to the vertical direction.

Whether or not the metal powder M falls in substantially the vertically downward direction to be discharged through the diameter-reduction part 23 depends on various elements such as the material and the diameter of the metal powder M, air flow, an amount of air flowing from the diameter-reduction part 23, temperature, and humidity. For this reason, the predetermined angle (inclination degree) may be determined depending on conditions in the cladding in consideration of the above-mentioned elements.

In other words, the term "substantially vertical" does not correspond to such an orientation that the metal powder M flowing in substantially the vertically downward direction from the vertical part 21 toward the diameter-reduction part 23 is not discharged through the diameter-reduction part 23 by inertial force and gravity, and accumulates in the duct.

The angle of the branched part 22 with respect to the vertical part 21, namely, the angle of the axis of the branched part 22 with respect to the axis of the vertical part 21 before branched (the vertical part 21 on the upstream side of the flow direction of the exhaust air) is preferably an acute angle. This makes it possible to reliably prevent the metal powder M from flowing toward the branched part 22.

As shown in FIG. 1, in the laser cladding apparatus 10, the lower end of the diameter-reduction part 23 is open. Therefore, the metal powder M having flowed to the diameter-reduction part 23 is discharged through the lower end of the diameter-reduction part 23 and accumulates in a pan 40.

On the other hand, the fumes F are extremely lighter than the metal powder M, and inertial force and gravity acting on the fumes F are smaller than inertial force and gravity acting on the metal powder M. Therefore, the fumes F move toward the branched part 22 through the flow of the exhaust air. Thereafter, the fumes F move to the dust collector 30 through the duct 20.

The diameter-reduction part 23 is configured not to interrupt the fall of the metal powder M by increasing the resistance of air flowing from the diameter-reduction part 23 to the branched part 22 and reducing the amount of incoming air due to the diameter of the diameter-reduction part 23 smaller than that of the vertical part 21.

In other words, the diameter-reduction part 23 is open, and the duct area (the area of the opening) of the diameter-reduction part 23 is reduced so that air flows into the diameter-reduction part 23 in such an amount that the fall of the metal powder M is not interrupted.

In the laser cladding apparatus 10 according to the embodiment, the duct 20 has the diameter-reduction part 23 arranged below the connection between the vertical part 21 and the branched part 22. The diameter-reduction part 23 has the portion whose duct area is smaller than that of the portion of the vertical part 21 above the connection between the vertical part 21 and the branched part 22. The lower end of the diameter-reduction part 23 is open below the portion with small duct area.

This makes it possible to easily collect the metal powder M separated from the exhaust air containing the metal powder M and the fumes F.

In the laser cladding apparatus 10 according to the embodiment, the branched part 22 forms an angle θ as an acute angle with the portion of the vertical part 21 situated above the connection between the vertical part 21 and the branched part 22.

This makes it possible to reliably separate the metal powder M from the exhaust air containing the metal powder M and the fumes F.

As mentioned above, in the laser cladding apparatus 10 according to the embodiment, most of the metal powder M is collected in the pan 40 arranged on the upstream side relative to the dust collector 30.

In the laser cladding apparatus 10, since the vertical part 21 is arranged in the substantially vertical direction, the metal powder M does not accumulate in the vertical part 21. In addition, since the exhaust air from which most of the metal powder M is separated flows on the downstream side relative to the branched part 22, an amount of the metal power M accumulating in the duct 20 is small compared with conventional one. As a result, frequency of cleaning of the duct is reduced, thus enabling to improve the operational efficiency of the laser cladding apparatus 10.

In the laser cladding apparatus 10, most of the metal powder M is collected on the upstream side relative to the dust collector 30. Therefore, clogging of the first filter 32 is restrained in the dust collector 30, thus enabling to increase the life of the first filter 32. Further, frequency of replacement of the first filter 32 is reduced, thus enabling to improve the operational efficiency of the laser cladding apparatus 10.

The laser cladding apparatus 10 may be provided with a valve (not shown) instead of the diameter-reduction part 23, the valve being attached to the lower end of the vertical part 21 to seal the lower end.

In this case, the metal powder M having fallen down accumulates in the duct 20 without flying toward the branched part 22. The accumulated metal powder M can be discharged to the outside of the duct 20 by opening the valve regularly. If the valve is arranged in this manner, it is unnecessary to take the inflow of air from the diameter-reduction part 23 into consideration. This makes it possible to reduce the displacement of the dust collector 30 (the exhaust fan 31).

In the laser cladding apparatus 10, a valve whose opening degree can be adjusted may be attached to the vertical part 21. This makes it possible to reliably separate the metal powder M from the exhaust air containing the metal powder M and the fumes F, and to reduce the amount of the exhaust air. Consequently, the running cost of the dust collector 30 can be reduced.

In the laser cladding apparatus 10 according to the embodiment, under the restriction that the air flow cannot be increased with no reason, the metal powder M is easily collected and is restrained from accumulating in the duct, consequently improving the operational efficiency.

The laser cladding apparatus 10 according to the embodiment dads the valve seats 2a of the exhaust ports 2 formed in the cylinder head 1 by irradiating the valve seats 2a with the laser beam while supplying the metal powder M to the valve seats 2a. The laser cladding apparatus 10 includes: the duct 20 connected to the exhaust ports 2; and the dust collector 30 that sucks the surplus of the metal powder M generated at the valve seats 2a. The duct 20 has the vertical part 21 formed in a straight tube and arranged so that the axis thereof is substantially vertical, and the branched part 22 branched from the vertical part 21 and arranged so that the branched direction is upward relative to the horizontal direction. The dust collector 30 is connected to the tip of the branched part 22.

This makes it possible to easily separate the metal powder M from the exhaust air containing the metal powder M and the fumes F. Therefore, the metal powder M can be restrained from accumulating in the duct 20, thus enabling to reduce frequency of maintenance of the duct 20 and the dust collector 30.

In the present embodiment, the duct 20 is connected to only the exhaust ports 2 out of the ports 2 and 3 formed in the cylinder head 1. However, as shown in FIG. 3, two ducts 20 may be connected to the exhaust ports 2 and the intake ports 3.

Figure 3:
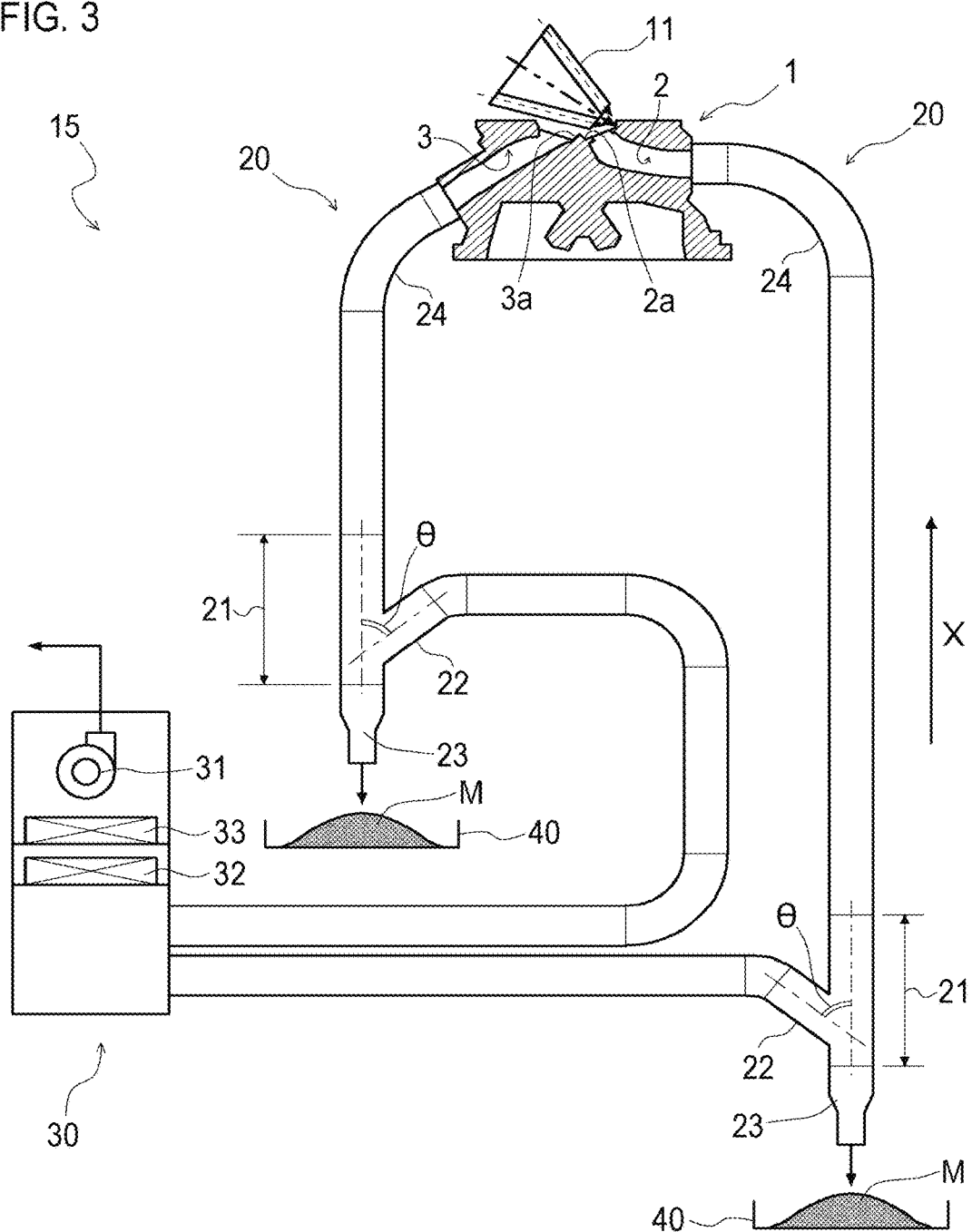
FIG. 3 shows an overall structure of a laser cladding apparatus according to an embodiment, where ducts are connected to exhaust ports and intake ports.

As shown in FIG. 3, a laser cladding apparatus 15 according to another embodiment dads the valve seats 2a and the valve seats 3a of the cylinder head 1. The laser cladding apparatus 15 includes the cladding nozzle 11, two ducts 20, and the dust collector 30.

Only by changing the orientation of the cladding nozzle 11, the laser cladding apparatus 15 can be changed from the state of cladding the valve seats 2a of the exhaust ports 2 to the state of cladding the valve seats 3a of the intake ports 3.

In the laser cladding apparatus 15, it is unnecessary to reconnect the duct 20 to the cylinder head 1, thus enabling to reduce the time for retooling during the cladding.

The laser cladding apparatus 15 enables decrease in time for cladding, compared with the laser cladding apparatus 10. Therefore, the laser cladding apparatus 15 enables further improvement of operational efficiency thereof.

What is claimed is:

1. A laser cladding apparatus that clads a portion of valve seats at a first end of an exhaust port or an intake port of a cylinder head by irradiating the portion with a laser beam while supplying metal powder to the portion, thereby the portion being partly coated with a metal different from the portion, the laser cladding apparatus comprising:
   a cladding nozzle that irradiates the portion with the laser beam and provides the metal powder through the first end of the exhaust port or the intake port to the portion;
   a duct connected to a second end of the exhaust port or the intake port; and
   a dust collector that sucks air in the exhaust port or the intake port through the duct collecting a surplus of the metal powder generated at the portion of the workpiece, wherein
   the duct has a vertical part that is formed in a straight tube and that is arranged so that an axis of the vertical part is substantially vertical, and a branched part that is branched from the vertical part and that is arranged so that a direction in which the branched part is branched is upward relative to a horizontal direction,
   the dust collector is connected to a tip of the branched part,
   the duct includes a diameter-reduction part that is arranged below a connection between the vertical part and the branched part, the diameter-reduction part including a narrowed portion whose duct area is smaller than a duct area of a portion of the vertical part situated above the connection,
   a lower end of the diameter-reduction part is open below the narrowed portion,
   the duct area is the area of an opening of the duct,
   the diameter-reduction part reduces an amount of incoming air due to a diameter of the narrowed portion being smaller than a diameter of the vertical part, and
   the metal powder having flowed to the diameter-reduction part from the vertical part is discharged through the lower end of the diameter-reduction part.

2. The laser cladding apparatus according to claim 1, wherein
   the branched part forms an acute angle with the portion of the vertical part situated above the connection.

3. A laser cladding apparatus that clads a portion of valve seats at a first end of an exhaust port or an intake port of a cylinder head by irradiating the portion with a laser beam while supplying metal powder to the portion, thereby the portion being partly coated with a metal different from the portion, the laser cladding apparatus comprising:
   a cladding nozzle that irradiates the portion with the laser beam and provides the metal powder through the first end of the exhaust port or the intake port to the portion;
   a duct connected to a second end of the exhaust port or the intake port, the duct including a vertical part and a branched part that is branched from the vertical part at a connection so that a direction in which the branched part is branched is upward relative to a horizontal direction; and
   a dust collector that sucks air in the exhaust port or the intake port through the duct collecting a surplus of the metal powder from vertical part through the branched part, the dust collector connected to the branched part distal from the connection, wherein
   the duct includes a diameter-reduction part below the connection, the diameter-reduction part including a narrowed portion whose duct area is smaller than a duct area of the vertical part above the connection,
   a lower end of the diameter-reduction part is open below the narrowed portion,
   the duct area is the area of an opening of the duct,
   the diameter-reduction part reduces an amount of incoming air due to a diameter of the narrowed portion being smaller than a diameter of the vertical part, and
   the metal powder having flowed to the diameter-reduction part from the vertical part is discharged through the lower end of the diameter-reduction part.

4. The laser cladding apparatus according to claim 1, further comprising:
   a laser that produces the laser beam; and
   a cladding nozzle that irradiates the portion of the workpiece with the laser beam.

5. The laser cladding apparatus according to claim 1, wherein
   the cylinder head includes the exhaust port and the intake port,
   the duct is a first duct connected to the second end of the exhaust port,
   the laser cladding apparatus includes a second duct that is connected to both the second end of the intake port and to the dust collector.

6. The laser cladding apparatus according to claim 1, wherein the nozzle provides a shielding gas to the portion.

* * * * *